United States Patent
Mishra et al.

[11] Patent Number: 5,891,225
[45] Date of Patent: Apr. 6, 1999

[54] METHOD FOR APPLYING HALIDE BRINES TO SURFACES

[75] Inventors: Surendra K. Mishra, The Woodlands; David J. Hanlon, Magnolia; Nam-Sook Bae, The Woodlands, all of Tex.

[73] Assignee: Tetra Technologies Inc, Houston, Tex.

[21] Appl. No.: 12,852

[22] Filed: Jan. 23, 1998

[51] Int. Cl.⁶ .............................. C23F 11/10; C09K 3/18
[52] U.S. Cl. ................. 106/14.42; 106/13; 106/14.13; 106/14.15; 106/14.41; 252/70; 252/389.1; 252/389.62; 252/390; 252/392
[58] Field of Search ............... 106/14.13, 14.15, 106/14.41, 14.42, 13; 252/70, 389.1, 389.62, 390, 392

[56] References Cited

U.S. PATENT DOCUMENTS

| | | | |
|---|---|---|---|
| 4,113,498 | 9/1978 | Rones et al. | 106/14.13 |
| 4,539,122 | 9/1985 | Son et al. | 252/389 |
| 4,668,416 | 5/1987 | Neal | 252/70 |
| 5,118,444 | 6/1992 | Nguyen | 252/390 |
| 5,302,307 | 4/1994 | Ireland | 252/70 |
| 5,330,683 | 7/1994 | Sufrin | 252/387 |
| 5,531,931 | 7/1996 | Koefod | 252/387 |
| 5,635,101 | 6/1997 | Janke et al. | 252/70 |
| 5,683,619 | 11/1997 | Ossaian et al. | 252/70 |

*Primary Examiner*—Anthony Green
*Attorney, Agent, or Firm*—Jo Katherine D'Ambrosio

[57] ABSTRACT

A method for applying halide brine to surfaces requiring protection against freeze conditions, inhibition of snow and ice accumulating, deicing or freeze retardation, for example, or dust control with limited corrosion is disclosed, the method comprising the steps of forming an admixture of polyhydroxy carboxylate and polyalkoxylated amine dispersed in an halide brine solution in an amount effective to inhibit corrosion; and applying the admixture to surfaces. The method of this invention can be used to limit corrosion in the application of a halide brine to surfaces of dust-producing materials as well as surfaces requiring protection against freeze conditions.

26 Claims, No Drawings

METHOD FOR APPLYING HALIDE BRINES TO SURFACES

FIELD OF THE INVENTION

The present invention relates to a method of applying halide brine to surfaces with limited corrosion. Particularly, the invention concerns an aqueous halide brine comprising a blend of polyhydroxy carboxylate and polyalkoxylated amine effective for dust control or deicing purposes.

BACKGROUND OF THE INVENTION

Halide brines, particularly sodium chloride and other alkali metal and alkaline earth metal salts such as calcium chloride and magnesium chlorides, are used extensively for inhibiting snow and ice accumulations on a variety of outside surfaces including such uses as deicing, melting snow and freeze conditioning of roadways, paved areas, bridges and the like as well as for surfaces of bulk materials, coal and minerals for example. They are also used for dust control on similar surfaces such as paved and unpaved roadways, especially during dry weather, and during the handling and transportation of dust-producing bulk materials, such as coal or other materials.

Aqueous solutions of these halides are known to corrode metals and cause scaling or surface damage to concrete. For example, heavy use of road deicers can result in serious damage to autos and other vehicles as well as rapid deterioration of metal reinforcing rods in poured concrete roadways and bridges. The halides used for dust control and for freeze conditioning of bulk materials such as coal or other minerals often cause corrosive deterioration of the materials-handling equipment, rail cars and other container carriers.

The need for corrosion inhibitors designed for deicing and snow control is well known. Chromates, phosphates, zinc salts and nitrites have been used to provide varying degrees of corrosion inhibition for halide brines. Nitrites have been noted only to change the nature of corrosion from general to localized, causing possible perforation in metals in very short time. Chromates, zinc salts and phosphates have come under increasing scrutiny due to environmental concerns.

U.S. Pat. No. 5,531,931 teaches the use of a deicing composition comprising a deicing salt and corrosion-inhibiting water soluble rare earth salt and/or a water-soluble organic acid salt. A deicing composition and method comprising by-products from a wet milling process of corn is disclosed in U.S. Pat. No. 5,635,101. A process for deicing a roadway surface comprising adding to a snow or ice covered roadway surface an effective amount of a composition consisting essentially of a lignosulfonate and metal chloride salt is taught in U.S. Pat. 4,668,416. U.S. Pat. No. 5,118,444 discloses use of an amine oxide surfactant blended with an agriculturally acceptable pesticide to reduce irritation to animals and corrosiveness to materials, the use of a liquid deicing composition comprising magnesium chloride and an organic inhibitor selected from the group consisting of triethanolamine, triethanolamine acid salts, citric acid, metal salts of citric acid and mixtures thereof was disclosed in U.S. Pat. No. 5,302,307.

There is a need, however, for a method for applying an environmentally acceptable, easy to use, deicing and freeze conditioning aqueous halide to outdoor surfaces without extensive metal corrosion or damage to cement structures. There is also a need in the art for a method of applying halide brines with improved corrosion-inhibition properties adapted for addition to otherwise conventional dust control compositions.

SUMMARY OF THE INVENTION

Accordingly, the present invention is directed to a method for applying an aqueous halide brine comprising a blend of polyhydroxy carboxylate and polyalkoxylated amine to surfaces with limited corrosion. The surprising discovery of this environmentally compatible blend is the synergistic effect illustrated by the marked improvement in corrosion inhibition and the ease of application for both freeze conditioning and dust control uses.

In a preferred method for applying halide brine to a surface with limited corrosion, the steps comprise: (a) forming an admixture of polyhydroxy carboxylate and polyalkoxylated amine dispersed in an halide brine solution in an amount effective to inhibit corrosion; and (b) applying the admixture of step (a) to a surface at a rate effective for protection against freeze conditions, inhibiting snow and ice or dust control. The cation of the halide brine is preferably selected from the group consisting of calcium, magnesium, sodium, potassium, lithium, or a combination thereof. Preferably the solution comprises from 0.1 to 42 weight percent calcium chloride. In the alternative, the solution can comprise from 0.1 to 34 weight percent magnesium chloride. In one preferred embodiment of this method, the polyhydroxy carboxylate can comprise an acid, preferably polyhydroxy carboxylic acid. The preferred polyhydroxy carboxylic acid comprises D-gluconic acid. Preferably, the admixture comprises from 10 to 20,000 mg/kg D-gluconic acid. Alternatively, the polyhydroxy carboxylate comprises a salt, preferably a salt of D-gluconic acid selected from the group consisting of sodium gluconate, potassium gluconate or a combination thereof. The preferred polyalkoxylated amine comprises polyethoxylated diamine, more preferably ethoxylated N-alkyl-1,3-diaminopropane. The preferred admixture comprises from 1 to 15,000 mg/kg of the polyethoxylated diamine. The diamine can have the general formula:

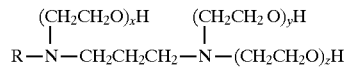

wherein R is fatty alkyl such as tallowalkyl and the sum of x, y and z totals an average of about 3 to 15.

In one embodiment, the admixture can be applied in step (b) to a surface in an amount effective to control snow or ice. In this application, the halide brine can comprise 0.1 to 26 weight percent sodium chloride. The admixture of step (b) is applied at the rate of from about 0.001 to about 2 gallons to a square yard.

In an alternative embodiment of the method of this invention, the admixture is applied in step (b) to a road surface for controlling dust. The rate of application during this dust control embodiment is from about 0.001 to about 5 gallons to a square yard, preferably, 0.1 to about 1.5 gallons to 1 square yard.

The admixture formed during a preferred method of this invention can be applied in step (b) by sprinkling. Alternatively, the admixture is applied in step (b) by spray nozzle.

During one preferred method of this invention, the rate of corrosion of steel by the admixture is reduced by at least 70 percent as compared to the rate of corrosion of steel by a sodium chloride brine of the same concentration but without the polyhydroxy carboxylate and the polyalkoxylated amine. Surprisingly, when polyhydroxy carboxylated acid and polyalkoxylated amine are used as a corrosion inhibitors, the concentration of the polyhydroxy carboxylate in the admixture of this method is less than the concentration required to obtain the same degree of corrosion inhibition when the polyhydroxy carboxylate is used alone without the polyalkoxylated amine. Similarly, the concentration of the polyalkoxylated amine in this invention's admixture is less than the concentration required to obtain the same degree of corrosion inhibition when the polyalkoxylated amine is used alone, without the polyhydroxy carboxylate. Also unexpected is the corrosion inhibition that occurs when the brine has a pH of less than 7.

In an alternative embodiment, in the method for deicing surfaces with a halide brine, comprising the step of applying the brine to the surface, an improvement to this method wherein the brine comprises forming an admixture of polyhydroxy carboxylate and polyalkoxylated amine dispersed therein in an amount effective to inhibit corrosion the admixture is then applied to surfaces subject to freeze conditions. In this improvement, the brine comprises from 0.1 to 42 weight percent calcium chloride. Alternatively, the brine comprises from 0.1 to 34 weight percent magnesium chloride. In another aspect, the brine comprises from 0.1 to 26 weigh percent sodium chloride. The preferred polyhydroxy carboxylate comprises D-gluconic acid, preferably 10 to 20,000 mg/kg D-gluconic acid. The preferred polyalkoxylated amine comprises polyethoxylated diamine, preferably 1 to 15,000 mg/kg polyethoxylated diamine. In another preferred embodiment, the polyethoxylated diamine comprises ethoxylated N-alkyl-1,3-diaminopropane. The diamine has the general formula:

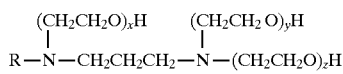

wherein R is fatty alkyl, preferably tallowalkyl and the sum of x, y and z totals an average of 3 to 15. In one preferred embodiment of this improved method, the brine is applied to road surfaces in an amount effective to control snow or ice.

In a preferred composition of a corrosion inhibited calcium or magnesium chloride brine for use on road surfaces, the brine comprises from 10 to 20,000 mg/kg D-gluconic acid and from 1 to 15,000 mg/kg ethoxylated N-alkyl-1,3-diaminopropane. Preferably, the ethoxylated N-alkyl-1,3-diaminopropane has the formula

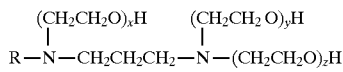

wherein R is fatty alkyl and the sum of x, y and z totals an average of 3 to 15 and, preferably, R is tallowalkyl.

In an alternative method of applying halide brine for corrosion-inhibited dust control the steps comprise: (a) forming an admixture of polyhydroxy carboxylate and polyalkoxylated amine dispersed in an halide brine solution in an amount effective to inhibit corrosion of metals; and (b) applying the admixture of step (a) to surfaces of dust-producing materials. In this preferred method, the cation of the halide brine is selected from the group consisting of calcium, magnesium, sodium, potassium, lithium, or a combination thereof. Preferably, the solution comprises from 0.1 to 42 weight percent calcium chloride. Alternatively, the solution comprises from 0.1 to 34 weight percent magnesium chloride. The preferred polyhydroxy carboxylate comprises D-gluconic acid, preferably, 10 to 20,000 mg/kg D-gluconic acid. The preferred polyalkoxylated amine comprises polyethoxylated diamine, more preferably, 1 to 15,000 mg/kg of the polyethoxylated diamine. In another preferred embodiment, the polyethoxylated diamine comprises ethoxylated N-alkyl-1,3-diaminopropane. The diamine has the general formula:

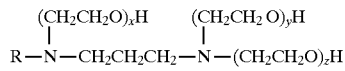

wherein R is fatty alkyl tallowalkyl, and the sum of x, y and z totals an average of 3 to 15. Preferably, the admixture is applied in step (b) to dust-producing materials at the rate of from about 0.001 to about 2.0 gallons to 1 square yard for controlling dust. Preferably, the admixture is applied in step (b) by sprinkling. Alternatively, the admixture is applied in step (b) by spray nozzle.

In another preferred method of applying a corrosion-limiting halide brine for deicing, melting of snow and freeze retardation of materials exposed to freeze conditions, the method comprises the steps of: (a) forming an admixture of polyhydroxy carboxylate and polyalkoxylated amine dispersed in an halide brine solution in an amount effective to inhibit corrosion of metals; and (b) applying the admixture of step (a) to surfaces of materials exposed to freeze conditions to limit corrosion. In this preferred method, the cation of the halide brine is selected from the group consisting of calcium, magnesium, sodium, potassium, lithium, or a combination thereof. Preferably, the solution comprises from 0.1 to 42 weight percent calcium chloride. Alternatively, the solution comprises from 0.1 to 34 weight percent magnesium chloride. In another aspect, the brine comprises from 0.1 to 26 weigh percent sodium chloride. The preferred polyhydroxy carboxylate comprises D-gluconic acid, preferably, 10 to 20,000 mg/kg D-gluconic acid. The preferred polyalkoxylated amine comprises polyethoxylated diamine, preferably, 1 to 15,000 mg/kg polyethoxylated diamine. In another preferred embodiment, the polyethoxylated diamine comprises ethoxylated N-alkyl-1,3-diaminopropane. The diamine has the general formula:

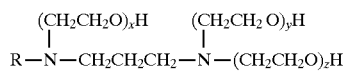

wherein R is fatty alkyl preferably tallowalkyl, and the sum of x, y and z totals an average of 3 to 15.

In the preferred method, the admixture is applied in step (b) to material surfaces in an amount effective to control snow or ice. The admixture can be applied in step (b) by sprinkling or, alternatively, the admixture can be applied by spray nozzle.

DETAILED DESCRIPTION OF THE INVENTION

The corrosive effect of halide brines on steel and other metals is limited by this invention's method of applying a halide brine comprising an environmentally-compatible corrosion inhibitor. The surprising discovery in the method of this invention is the synergistic effect of improved corrosion-inhibiting properties resulting from a blend of environmentally innocuous corrosion inhibitors as applied to various surfaces. Any surface exposed to freezing weather or dust-producing conditions can benefit from the synergistic blend applied during the method of this invention. The preferred method comprises a two-step process; the formation of a blend of polyhydroxy carboxylate and polyalkoxylated amine dispersed within a halide brine solution, and the application of the resulting blend to surfaces requiring freeze conditioning, melting of snow, deicing and freeze retardation, or dust control.

Typical surfaces that require treatment for exposure to freezing weather or dust-yielding conditions are roadways, pavements, paved and unpaved open areas such as stock yards, bridges and the like. Alternatively, coal and other minerals or materials carried in metal railway cars, stockpilers or open containers also require protection from exposure to freezing weather conditions. These materials may also produce dust that must be contained so as to limit pollution of the environment. Automobiles, metal rods used in construction of roads and bridges and the steel and metal components associated with the railways and other materials—handling equipment benefit from the corrosion-inhibiting feature of the present invention during treatments for freezing weather conditions and/or dust control.

In the practice of this invention, calcium chloride is a preferred halide for use in the method of applying a halide brine solution to various surfaces for deicing, freeze retardation and dust control purposes. Preferably, the chloride solution comprises a weight percentage effective to achieve protection against freezing weather conditions or dust control. Users familiar with the art can determine more exact percentages by the weather or dust-producing conditions at the time of application. A more preferred weight percent is within a range of from 0.1 to 42 weight percent calcium chloride. Alternatively, the halide can comprise magnesium chloride, sodium chloride (traditionally used as a deicer), potassium chloride, or, though expensive, lithium chloride. Again, users familiar with the art of freeze conditioning and dust control can determine the weight percentage of the halide at the time of application. Preferably, these alternative halides are present in the solution in amounts comprising 0.1 to 34 weight percent halide.

In general, sodium chloride is less effective than magnesium or calcium chloride for both deicing and dust control. In deicing, sodium chloride has less melting power and cannot be used at as low a temperature as magnesium or calcium chloride. In dust control, magnesium and calcium chloride retain moisture better than sodium chloride. In deicing, calcium chloride has more melting power and can be used in a higher concentration than magnesium chloride, but it is generally thought that uninhibited calcium chloride is more corrosive than magnesium chloride. However, with the corrosion inhibiting admixture of the present invention, the corrosion caused by calcium chloride brines is significantly limited, i.e. the rate of corrosion of steel with corrosion inhibitors is reduced by at least 70% as compared to the rate of corrosion inhibition in a sodium chloride brine of the same concentration but without the corrosion inhibitors of this invention.

The concentration of the salt in the brine solutions depends on the specific application. For dust control, the salt concentration generally ranges from 0.1 to 42 weight percent. For deicing or inhibiting the accumulation of ice and snow, the brine concentration can depend on the ambient temperature, rate and quantity as well as the type of precipitation, i.e., snow or sleet or rain, and the frequency or application or duration of protection. These parameters are generally known to these skilled in the art.

The composition of the corrosion inhibitors of the current method is soluble in the halide brine solutions and is relatively easy to mix. A preferred composition is a blend of polyhydroxy carboxylate and polyalkoxylated amine dispersed within a halide solution in an amount effective to inhibit corrosion. The polyhydroxy carboxylate can be a free acid and/or in the form of a salt, D-gluconic acid and/or sodium D-gluconate, for example. Lower concentrations of the corrosion-inhibiting compositions are required to achieve effective corrosion protection than either of the individual components when used alone. Therefore, it is more economical and convenient during the practice of the method of this invention, for the user to blend the corrosion inhibitors with the brine solution. The resulting blend or admixture is applied to surfaces of the material requiring protection against freeze conditions or dust control.

Preferably, the admixture formed during the method of this invention comprises polyhydroxy carboxylate in the form of D-gluconic acid and polyalkoxylated amine. D-gluconic acid [$CH_2OH(CHOH)_4COOH$] is present in the admixture in an amount comprising 10 to 20,000 milligrams per kilogram. A preferred polyalkoxylated amine comprises polyethoxylated diamine available under the tradename, Ethoduomeen-T/13 supplied by Akzo Nobel Chemicals, Inc. Preferably, the admixture comprises from 1 to 15,000 mg/kg of the polyethoxylated diamine, more preferably, from 100 to 10,000 mg/kg, especially from 100 to 5,000 mg/kg. A preferred diamine as found in the commercial product, Ethoduoamine-T/13, is ethoxylated N-alkyl-1,3-diaminopropane with the following the general formula:

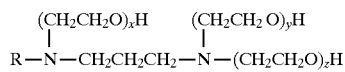

wherein R is tallowalkyl and the sum of x, y and z totals an average of about from 3 to 15. The preferred composition in the application step of this method of this invention is a blend which comprises D-gluconic acid and polyethoxylated diamine. The corrosion inhibition resulting from this blend is more effective than either component alone when previously used for protection against freeze conditions and dust control. Test results noted a synergistic effect from the blend of D-gluconic acid and diamines not only in improved corrosion-inhibiting properties but also biocidal properties. Lesser concentrations of the corrosion inhibitor are necessary to achieve effective results. Also noted is that when D-gluconic acid is used alone as a corrosion inhibitor, the growth of microorganisms is observed. It was discovered that the addition of the diamine in the blend of this invention inhibits this microbial growth.

The pH of the resulting admixture or blend of D-gluconic acid and polyethoxylated diamine in the brine of this invention is relatively low, within a range of about 0 to about 3. Unexpectedly, the admixture is not as corrosive as would be expected at this low pH range. Some users, however, may prefer a less acidic pH, within a range of 4 to 7 for example and the pH can be adjusted accordingly. Within this range of pH, the blend remains active as a corrosion inhibitor.

In the method of this invention, the admixture resulting from the blend of polyhydroxy carboxylate and polyalkoxylated amine dispersed within a halide solution is applied to the surface of the material requiring deicing or dust control. One preferred rate of application is from about 0.001 to 5.0 gallons of admixture to 1 square yard of surface treated. Rates vary according to the surface receiving the application and weather conditions at the time of application and a user can adjust the rate according to rates of applying halide brines for a particular application as known in the art. In dust control applications, the rate of application can also vary depending on the surface to be treated. With unpaved roads, for example, the rate of application can be adjusted within a preferred range of 0.1 to 1.5 gallon of blend to one square yard of road. Treatment rates of application for other surfaces are known in the art.

The admixture resulting from step one described above can be applied to the surfaces of roads, bridges or bulk substances carried in open containers by any of several methods known in the art. One preferred method is sprinkling of the admixture solution over the surface requiring freeze conditioning or dust control. Another preferred method is spraying the admixture by nozzles, preferably pressurized nozzles, so that the mechanical action of the spray increases the penetration of the admixture into unpaved road surfaces, ice or snow. Other known methods can be used to apply the admixture.

EXAMPLES

Corrosion Test Procedure

The corrosion test procedures used during testing of corrosion inhibitors for the practice of this invention were based on Washington State Department of Transportation (WSDOT) Deicer Test Procedures set in fall of 1995.

The following test procedures were modified according to National Association of Corrosion (NACE) Standard TM-01-69 (1976 rev.). The requirement set by the WSDOT is that the inhibited deicer product must prove to have a corrosion rate at least 70% less than the corrosion rate of uninhibited sodium chloride. Tests were carried out at room temperature. J. T. Baker 'ANALYZED REAGENT' 99.7% pure sodium chloride and distilled water were used in each test to establish the standard. WSDOT has modified this test procedure in which approximately 30 ml of 3% solution per square inch of coupon surface area is used for corrosion test. An acceptable volume variance from 30 ml is +/−5 ml per square inch of coupon.

Preparation of Coupons

The coupons used during testing were ½ in. (approximately 1.06 in. O.D.×0.50 in. I.D.×0.10 in. thick) flat steel washers (ASTM Black F 463). The coupons were all of the same batch to assure accuracy in test results. Before use in corrosion tests, the coupons were cleaned with chloroform and dried (to remove oils) followed by sandblasting. Three coupons were used for each test solution and for the distilled water control tests. Each set of three coupons was stamped with a number for identification.

The outside diameter, inside diameter, and the thickness of each coupon was measured with a micrometer. Then the surface area of each coupon was calculated with the following formula:

$$A = 3.1416/2\ (D^2 - d^2) + 3.1416tD + 3.1416td$$

where D represents the outside diameter, d represents the inside diameter, and t represents the thickness. The unit of measurement in the above formula is inches. The coupons were finally rinsed in chloroform bath, air dried, and weighed.

Corrosion Testing

Approximately 300 ml of each solution as mixed with distilled water was put into a 500 ml Erlenmeyer flask. Each flask was equipped with a rubber stopper that had been drilled to allow a line to run through it. One end of the line was attached to a frame made to hold coupons inside the flask and the other end of the line was attached to a bar. The bar was lowered and raised using a pneumatic system. The system was arranged in such a way that the bar was lowered for 10 minutes and then raised for 50 minutes. This allowed the coupons to be exposed to the test solution for 10 minutes of each hour. This lowering and raising of coupons was continued for 72 hours.

The coupons were removed from the solution after the aforementioned test cycle of 72 hours. They were placed into glass beakers containing the cleaning acid composed of concentrated hydrochloric acid containing 50g/L $SnCl_2$ and 50 g/L of $SbCl_3$. After 15 minutes of cleaning, the coupons were removed from the cleaning acid, rinsed with deionized water, and wiped with a cloth to clean any deposit from the coupons. They were then returned to the cleaning acid and the procedure was repeated. They were finally rinsed in chloroform, air dried, and weighed.

The weight loss of each coupon was determined by subtracting the final weight from the original weight. The corrosion rate was calculated as mils penetration per year (MPY) by the following formula:

$$MPY = \text{weight loss (mg)} \times 534 \div (\text{area in square inches})\ (\text{time})\ (\text{metal density})$$

where metal density in this test series was taken to be 7.45 for steel. Each point of corrosion rate reported is a mean of the rates obtained from three individual corrosion tests. Standard deviations were calculated for each set of tests results.

Evaluation of the potential corrosion inhibitors was performed with various concentrations of two different inhibitors. Each corrosion inhibitor has its own functional group. The purpose of mixing two inhibitors was to determine whether a synergistic effect was obtained with two different functional groups. Test blends for evaluation of these corrosion inhibitors were prepared as follows:

1. Aliquots of deionized water and an inhibitor were mixed, then an aliquot of second inhibitor was added to the mixture to prepare a blend solution.
2. An aliquot of 38% liquid calcium chloride was added to the blend solution to obtain 32% inhibited liquid calcium chloride. An aliquot of each 32% inhibited liquid so prepared was stored at −15° C. and 20°−25° C. to observe its physical appearance.
3. Each 32 wt% inhibited liquid calcium chloride was diluted to 3% with deionized water for the measurement of corrosion rate.

Example

The blends of polyethoxylated diamine and D-gluconic acid were prepared and evaluated for their corrosion rates according to the above-described testing procedure and methods. The amounts of D-gluconic acid and polyethoxylated diamine used during these tests were 1000 mg/kg and 200 mg/kg respectively. The results are indicated in Table 1.

TABLE 1

CORROSION INHIBITION TEST RESULTS

| Salt Concentrations (wt %) | | Additives (mg/kg) | | Corr. Rate | | |
|---|---|---|---|---|---|---|
| NaCl | CaCl$_2$ | D-Gluconic Acid | polyethoxylated diamine | (MPY) | STD | % Red. over NaCl Rate |
| D-Gluconic Acid | | | | | | |
| Nil | Nil | Nil | Nil | 7.5 | 0.99 | NA |
| 3 | Nil | Nil | Nil | 60.08 | 8.55 | NA |
| Nil | 3 | Nil | Nil | 34.94 | 3.32 | 41.8 |
| Nil | 3 | 1000 | Nil | 24.73 | 4.85 | 58.8 |
| Polyethoxylated diamine: | | | | | | |
| Nil | Nil | Nil | Nil | 7.5 | 0.99 | NA |
| 3 | Nil | Nil | Nil | 60.08 | 8.55 | NA |
| Nil | 3 | Nil | Nil | 34.94 | 3.32 | 41.8 |
| Nil | 3 | Nil | 200 | 20.84 | 5.13 | 65.3 |
| D-Gluconic Acid + Polyethoxylated diamine: | | | | | | |
| Nil | Nil | Nil | Nil | 7.5 | 0.99 | NA |
| 3 | Nil | Nil | Nil | 60.08 | 8.55 | NA |
| Nil | 3 | Nil | Nil | 34.94 | 3.32 | 41.8 |
| Nil | 3 | 1000 | 200 | 13.81 | 3.75 | 77 |

The preferred method of producing the composition blend of polyethoxylated diamine and D-gluconic acid is as follows: an aliquot of 200 g 50% D-gluconic acid was diluted to 400 g with deionized water. An aliquot of 10 g to 20 g polyethoxylated diamine was admixed to this diluted solution of D-gluconic acid. The admixture was stirred with a magnetic stirrer until the polyethoxylated diamine dissolved completely. About thirtyfour (34) grams of 40% sodium hydroxide solution were slowly added to the admixture to adjust the pH to about 4.5 to 5.0. This composition was used as an additive to calcium chloride or magnesium chloride to reduce their corrosiveness. With the calcium chloride brine, the composition is further diluted to about less than 10% of the active blend of D-gluconic acid and polyethoxylated diamine. If the concentration of the active blend is more than 10%, there is a tendency for precipitation to occur even at room temperatures or lower.

The blend of D-gluconic acid and polyethoxylated diamine, even with varied quantities illustrates again a synergistic effect of improved corrosion rates. Similar tests procedures were performed using the sodium salt of polyhydroxy carboxylate, specifically sodium D-gluconate. The blend of sodium D-gluconate and polyethoxylated diamine yielded a similar reduction in corrosion rates as the acid. Brines containing salts of D-gluconate when stored at low temperatures formed two separate phases after a period of time. Microbial growth was also noted in stored samples of the salts. Immediate use of the blend of sodium D-gluconate and polyethoxylated diamine, however, can be effective for improved corrosion inhibition.

The blend of D-gluconic acid and polyethoxylated diamine, used in the method of this invention as described in the above Example, is soluble in brine solutions and therefore mix relatively easily. Because lower concentrations are can be used, the user has an easier time admixing the blend with the brine solution to be applied to surfaces requiring freeze conditioning or dust control.

The foregoing description is illustrative and explanatory of preferred embodiments of the invention, and variations in the size, shape, materials and other details will become apparent to those skilled in the art. It is intended that all such variations and modifications which fall within the scope or spirit of the appended claims be embraced thereby.

We claim:

1. A method for applying halide brine to a surface with limited corrosion comprising the steps of:

(a) forming an admixture of polyhydroxy carboxylate and polyalkoxylated amine dispersed in an halide brine solution in an amount effective to inhibit corrosion; and (b) applying the admixture of step (a) to a surface in an amount effective for protection against freeze conditions or for dust control.

2. The method of claim 1 wherein the cation of the halide brine is selected from the group consisting of calcium, magnesium, sodium, potassium, lithium, and combinations thereof.

3. The method of claim 1 wherein the solution comprises from 0.1 to 42 weight percent calcium chloride.

4. The method of claim 1 wherein the solution comprises from 0.1 to 34 weight percent magnesium chloride.

5. The method of claim 1 wherein the polyhydroxy carboxylate comprises polyhydroxy carboxylic acid.

6. The method of claim 1 wherein the polyhydroxy carboxylate comprises a salt of polyhydroxy carboxylate selected from the group consisting of sodium carboxylate, potassium carboxylate or a combination thereof.

7. The method of claim 5 wherein the polyhydroxy carboxylate comprises from 10 to 20,000 mg/kg D-gluconic acid.

8. The method of claim 7 wherein the polyhydroxy carboxylate comprises a salt of D-gluconic acid selected from the group consisting of sodium gluconate, potassium gluconate or a combination thereof.

9. The method of claim 1 wherein the polyalkoxylated amine comprises from 1 to 15,000 mg/kg of the polyethoxylated diamine.

10. The method of claim 9 wherein the polyethoxylated diamine comprises ethoxylated N-alkyl-1,3-diaminopropane.

11. The method of claim 9 wherein the diamine has the general formula

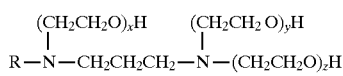

wherein R is tallowalkyl and the sum of x, y and z totals an average of about 3 to 15.

12. The method of claim 1 wherein the admixture is applied in step (b) to the surface in an amount effective to control snow or ice.

13. The method of claim 12 wherein the halide brine comprises 0.1 to 26 weight percent sodium chloride.

14. The method of claim 1 wherein the admixture is applied in step (b) to the surface at the rate of from about 0.001 to about 5.0 gallon to 1 square yard for controlling dust.

15. The method of claim 1 wherein the admixture is applied in step (b) by sprinkling.

16. The method of claim 1 wherein the admixture is applied in step (b) by spray nozzle.

17. The method of claim 1 wherein the rate of corrosion of steel by the admixture is reduced by at least 70 percent as compared to the rate of the corrosion of steel by the same concentration of a sodium chloride brine without polyhydroxy carboxylate or the polyalkoxylated amine.

18. The method of claim 17 wherein the concentration of the polyhydroxy carboxylate in the admixture is less than the concentration required to obtain the same degree of corrosion inhibition with the polyhydroxy carboxylate alone without the polyalkoxylated amine.

19. The method of claim 17 wherein the concentration of the polyalkoxylated amine in the admixture is less than the concentration required to obtain the same degree of corrosion inhibition with the polyalkoxylated amine alone without the polyhydroxy carboxylate.

20. The method of claim 17 wherein the brine has a pH of less than 7.

21. A corrosion inhibited calcium or magnesium chloride brine for use on road surfaces comprising from 10 to 20,000 mg/kg D-gluconic acid and from 1 to 15,000 mg/kg ethoxylated N-alkyl-1,3-diaminopropane.

22. The brine of claim 21 wherein the ethoxylated N-alkyl-1,3-diaminopropane has the formula

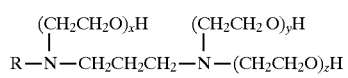

wherein R is fatty alkyl and the sum of x, y and z totals an average of 3 to 15.

23. The brine of claim 22 wherein R is tallowalkyl.

24. In a method for controlling snow and ice on a surface with a halide brine, comprising the step of applying the brine to the surface, the improvement wherein the brine comprises polyhydroxy carboxylate and polyalkoxylated amine dispersed therein in an amount effective to inhibit corrosion.

25. A method for applying halide brine for corrosion-inhibited dust control comprising the steps of:

(a) forming an admixture of polyhydroxy carboxylate and polyalkoxylated amine dispersed in an halide brine solution in an amount effective to inhibit corrosion; and (b) applying the admixture of step (a) to surfaces of dust-producing materials.

26. A method for applying a corrosion-limiting halide brine for deicing, melting of snow and freeze retardation of materials exposed to freeze conditions, the method comprising the steps of:

(a) forming an admixture of polyhydroxy carboxylate and polyalkoxylated amine dispersed in a halide brine solution in an amount effective to inhibit corrosion of metals; and (b) applying the admixture of step (a) to surfaces of materials exposed to freeze conditions to inhibit freezing.

* * * * *

UNITED STATES PATENT AND TRADEMARK OFFICE
CERTIFICATE OF CORRECTION

PATENT NO.  : 5,891,225
DATED       : April 6, 1999
INVENTOR(S) : Mishra et al.

It is certified that error appears in the above-indentified patent and that said Letters Patent is hereby corrected as shown below:

In the Abstract at line 7, "an halide brine" should read "a halide brine".

At col. 1, line 39, "in very" should read "in a very".
At col. 2, line 13, "an halide brine" should read "a halide brine".
At col. 2, line 16, "ice or" should read "ice, or".
At col. 2, line 66, "as a corrosion inhibitors" should read "as corrosion inhibitors".
At col. 3, line 54, "an halide brine" should read "a halide brine".
At col. 4, line 20, "an halide brine" should read "a halide brine".
At col. 5, line 58, "to these skilled" should read "to those skilled".
At col. 6, line 1, "protection than either" should read "protection greater than either".
At col. 6, line 17, "10,000 mg/kg ." should read "10,000 mg/kg
At col. 6, line 17, "5,000 mg/kg ." should read "5,000 mg/kg."
At col. 6, line 63, "one square" should read "1 square".
At col. 7, line 23, "for orrosion" should read "for the corrosion".

UNITED STATES PATENT AND TRADEMARK OFFICE
CERTIFICATE OF CORRECTION

PATENT NO. : 5,891,225
DATED : April 6, 1999
INVENTOR(S) : Mishra et al.

It is certified that error appears in the above-indentified patent and that said Letters Patent is hereby corrected as shown below:

At col. 8, line 29, "set of tests" should read "set of test".
At col. 8, line 44, "-15° C." should read "-15° C".
At col. 8, line 45, "C. to" should read "C to".
At col. 9, line 43, "room temperatures" should read "room temperature".
At col. 9, line 46, "Similar tests" should read "Similar test".
At col. 9, line 60, "therefore mix" should read "therefore mixes".
At col. 9, line 61, "are can be used" should read "can be used".
At col. 10, line 34, "an halide brine" should read "a halide brine".
At col. 11, line 7, "about 4" should read "about 3".
At col. 12, line 22, "an halide brine" should read "a halide brine".

Signed and Sealed this

Twenty-sixth Day of October, 1999

Attest:

Q. TODD DICKINSON

*Attesting Officer*     *Acting Commissioner of Patents and Trademarks*